W. M. SMITH.
AUTOMATIC FENDER AND BRAKE.
APPLICATION FILED NOV. 10, 1914.
1,133,673.
Patented Mar. 30, 1915.
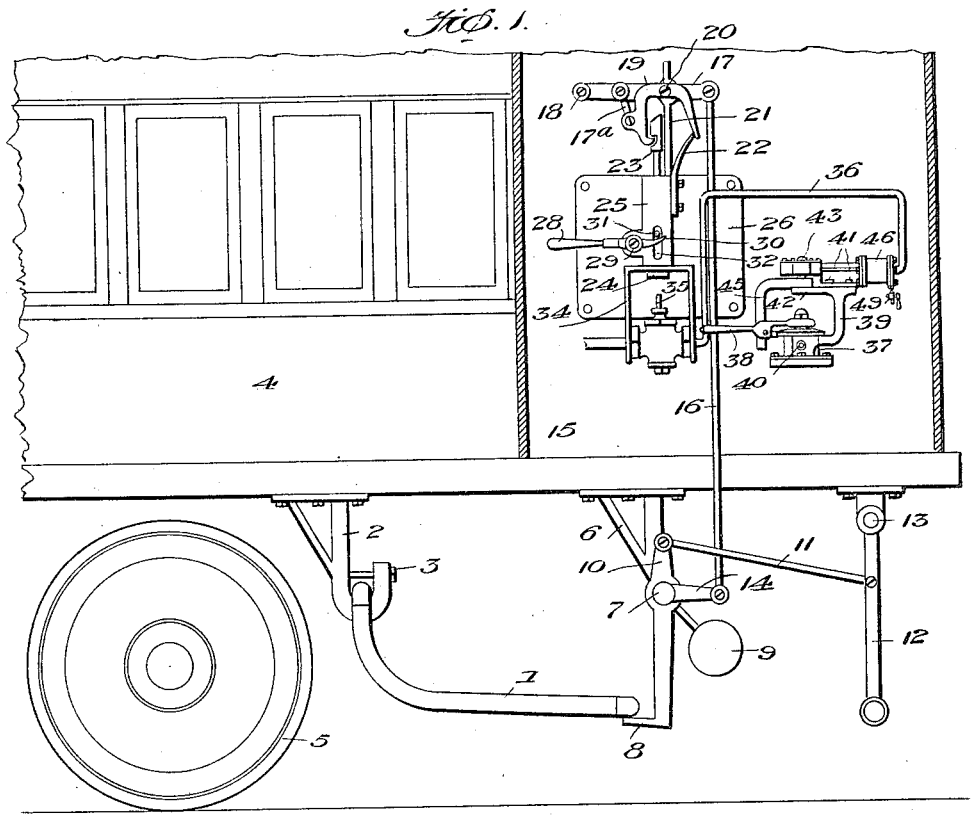
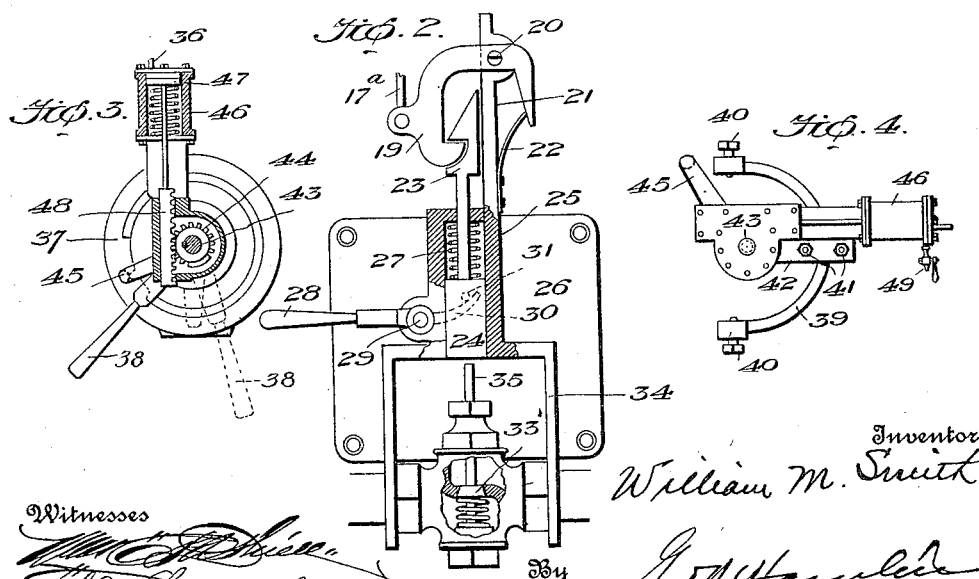

UNITED STATES PATENT OFFICE.

WILLIAM M. SMITH, OF EVANSVILLE, INDIANA.

AUTOMATIC FENDER AND BRAKE.

1,133,673.   Specification of Letters Patent.   Patented Mar. 30, 1915.

Application filed November 10, 1914. Serial No. 871,334.

*To all whom it may concern:*

Be it known that I, WILLIAM M. SMITH, a citizen of the United States, residing at Evansville, county of Vanderburgh, and State of Indiana, have invented certain new and useful Improvements in Automatic Fenders and Brakes, of which the following is a specification.

This invention relates to automatic fenders and brakes.

My object is to provide an automatic combined air brake and fender, whereby when the fender is struck, the air brake of the car will be automatically applied and thus cause immediate stoppage of the car, even though the motorman should neglect to apply the air brake.

In the present invention, I combine with the fender, which may be of any ordinary construction, trip mechanism adapted to be struck by the object on the track, and automatic means thrown into action when the fender is released, whereby the usual motorman's brake valve is thrown to the emergency position.

The invention comprises certain improved features and novel combinations of parts and mechanisms more fully set forth hereinafter.

In the accompanying drawings: Figure 1 is a side elevation of the front end of a car provided with my improvements, the cab being in section; Fig. 2, a detail elevation, partly in section, of the controlling valve mechanism and the latch; Fig. 3, a plan view, partly in section, of the brake valve actuating means; and Fig. 4, a plan view of the brake valve actuating mechanism detached from the brake valve.

The fender 1 is pivotally supported by hangers 2 and retained by bolts 3 from the sills of the car 4 in front of the wheels 5. I wish it understood, however, that the fender 1 could be placed at the extreme front of the car or in some other position than that shown in the drawings, within the spirit and scope of the invention.

I do not limit myself to any particular construction of the fender 1, as any well-known or preferred fender may be used.

Secured to the sills of the car are hangers 6 in which is journaled a shaft 7 carrying one or more hooks 8 and a counterweight 9.

Secured to the shaft 7 is an arm 10 which is connected by a rod 11 to a guard or trip 12 hung from the sills of the car at 13 and positioned so that it will be struck by the object on the track. If preferred, two arms 10 and two rods 11 may be provided at opposite sides of the car. Secured to the shaft 7 is an arm 14.

Suitably located in the cab or vestibule 15 of the car 4 is the mechanism which is adapted to coöperate with the motorman's air brake valve. This mechanism is operated by a rod 16 which is connected to the arm 14 at its lower end and at its upper end is pivoted to a lever 17, which is pivoted at 18 to the wall of the cab 15 and connected by any suitable means, as for instance, a link 17ª, to a latch 19 which is pivoted at 20 to a guide or standard 21, and is normally pressed by spring 22 into engagement with the head 23 of the operating plunger 24 which is slidable in the casing 25 and is carried by a plate 26 which may be suitably secured to the cab of the car. A spring 27 tends to press the operating plunger 24 outwardly in relation to its casing 25, but this movement is prevented by the latching parts 19 and 23. To re-set the plunger 24 and latch 23, after they have operated, I provide a hand lever 28, which is pivoted at 29 and is provided with a fork 30 which is adapted to engage pins 31 on the plunger 24 and which operate in slots 32 and prevent the plunger 24 from turning, thereby insuring the proper position of the latch 23 so that it may be engaged by the latch 19 when the former is raised.

The mechanism just described is positioned adjacent a spring-seated valve 33 and, preferably, the casing 25 is connected to the valve casing by a suitable yoke 34 to insure the plunger 24 being in alinement with the stem 35 of the valve 33. When the plunger 24 is in its raised or latched position, it is just above the upper end of the stem 35 and the valve 33 is then closed. The valve 33 controls an air pipe line 36 and by the admission and cut off of the air pressure, operates the mechanism which turns the motorman's air brake valve.

The invention is adapted for application to the ordinary motorman's brake valve having the casing 37 and handle 38 and as this construction is well known, further description is unnecessary.

My improved mechanism for shifting the handle 38 is carried by a yoke 39 which has screws 40 adapted to engage the sides of the casing 37 to secure the frame in proper relation thereto. To the frame 39 is suitably fastened as at 41, a casting 42 in which is mounted a short shaft 43 which carries on its upper end a pinion 44 and on its lower end an operating arm 45, the latter projecting downwardly so that it is adapted to bear against the handle 38 of the brake valve.

Secured to the frame 42 is a cylinder 46 in which operates a spring-retracted piston 47 to whose piston rod is connected a rack 48 which meshes with the pinion 44. Normally the spring holds the piston 47 in retracted position and the operating arm 45 is then retracted to such point that it will not interfere with the free manipulation of the handle 38 by the motorman so that the air brake valve may be used in the ordinary manner for applying or letting off the air brakes. When, however, air is admitted through pipe 36 by the opening of the valve 33 by the descent of the plunger 24, the air pressure admitted to the cylinder advances the piston 47 against the action of its spring and turns the pinion 44, instantly throwing the handle 38 to the emergency position and applying the air brakes. After the mechanism has acted, the handle 28 is operated to restore the plunger 24 to normal position and cause re-latching of the parts 19 and 23, whereupon the valve 33 re-seats itself and cuts off the admission of air back of the piston 47, but there is a residual air pressure in the cylinder pipe 36 and I, therefore, provide a hand-operated bleed valve 49 which can be opened to let out this air, whereupon the spring causes the operating arm 45 to be retracted and the handle 38 can then be brought back to running position by hand.

Under normal conditions, the parts are shown as in Fig. 1, with the fender 1 in raised position and held up by the hook or hooks 8. The counterweight 9 tends to throw the hook or hooks 8 underneath the fender 1 and to maintain said hook or hooks in said position, despite jar or vibration of the car. If the motorman fails to apply his brakes, and the object on the track strikes the trip or guard 12, the latter swings rearwardly and withdraws the hook or hooks 8 from beneath the fender 1, whereupon the latter immediately drops to the track in position to pick up the object or person. The foregoing operation causes the rod 16 to be shifted upwardly, thereupon swinging the lever 17 upwardly on its pivot 18 and withdrawing the latch 19 from its engagement with the head 23. Immediately the head 23 is released, the spring 27 will thereupon snap the plunger 24 downwardly. As the spring 27 is stronger than the spring of valve 33, the valve 33 will be opened and held in open position. Air pressure through pipe 36 then operates the plunger 47, which, through the rack 48 and pinion 44, instantly swings the arm 45, and the latter throws the handle 38 of the motorman's brake valve to the emergency position so that the air brakes are immediately applied and the car stopped.

Having thus described my invention, what I claim as new and desire to secure by Letters Patent, is:

1. In an automatic fender and brake, the combination with a fender, of a hand-operated air-brake controlling valve adapted for normal use without effect on the fender, air operated means for operating the said air-brake controlling valve, and means operated when the fender is struck which in turn controls the operation of the air operated means without interfering with normal free hand-operation of the said valve for usual braking purposes, whereby the said air brake valve is automatically operated and the air brakes are applied when the fender is struck.

2. In an automatic fender and brake, the combination with a drop fender, of a trip, sustaining means for the fender, operatively connected to the trip, a hand-operated air-brake controlling valve adapted for normal use without effect on the fender, and air operated means controlled by the trip adapted to shift the said valve, whereby the air brakes are automatically applied when the fender is released.

3. In an automatic fender and brake, the combination with a drop fender, of a rockable hook, a counterweight connected thereto adapted to normally position the hook to engage the fender, a depending swinging trip or guard, a connection between the guard and the hook, an arm connected to the hook, air brake controlling means, and a rod connecting the arm to the air brake controlling means, whereby the latter is set into operation when the trip is struck by an object.

In testimony whereof, I hereunto affix my signature in presence of two witnesses.

WILLIAM M. SMITH.

Witnesses:
 WILLIAM F. HOFFMANN,
 LEO F. PETERS.

Copies of this patent may be obtained for five cents each, by addressing the "Commissioner of Patents, Washington, D. C."